Dec. 22, 1970  J. A. PETRIE ET AL  3,549,270
SEALING DEVICE
Filed Jan. 10, 1969
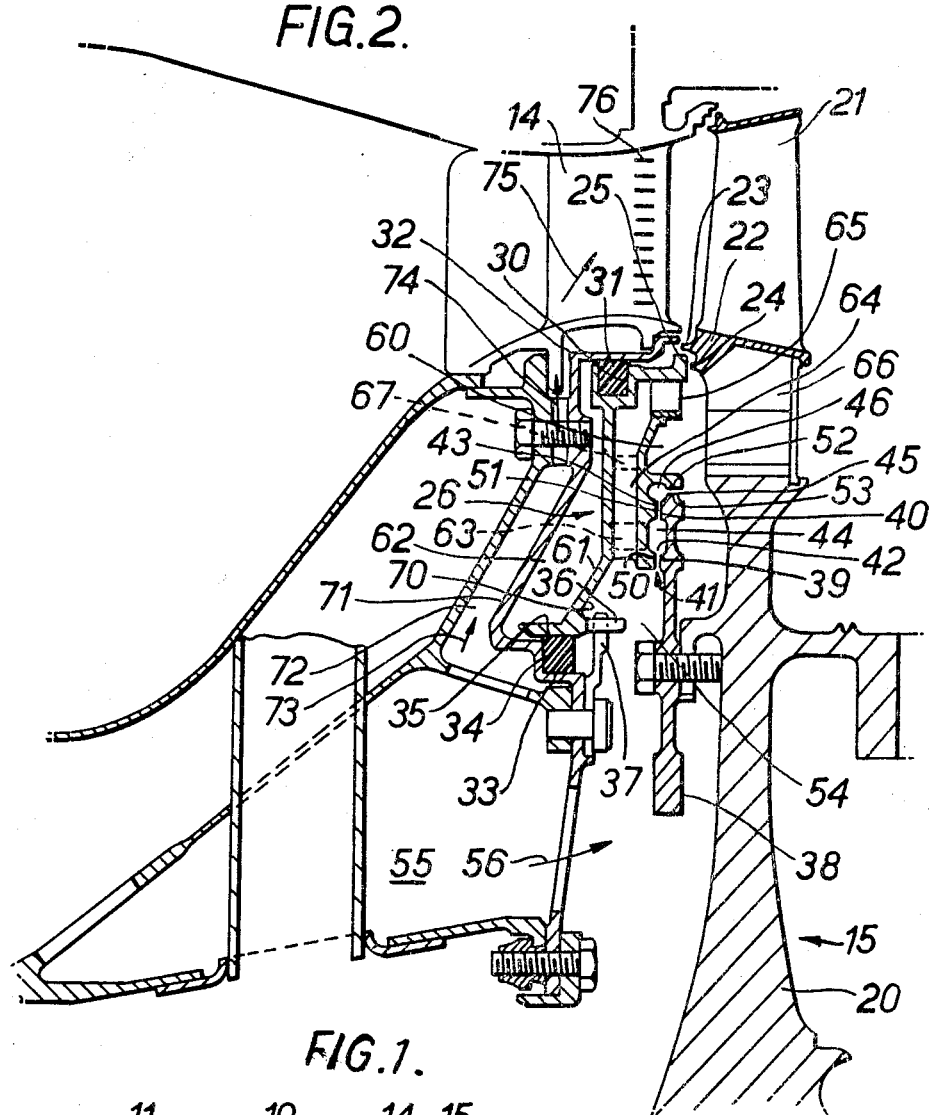
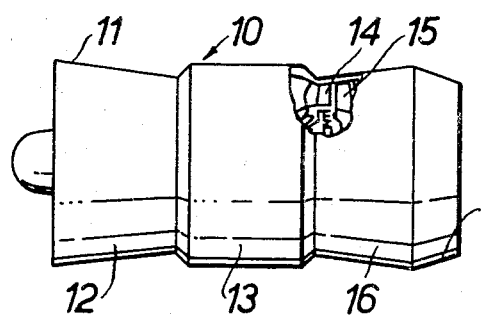
INVENTORS
JAMES ALEXANDER PETRIE
THOMAS STEEL
MICHAEL POUCHER
CLIFFORD JOHN FRANKLIN
DENIS McCARTHY
By
Cushman, Darby & Cushman
ATTORNEYS United States Patent Office 3,549,270
Patented Dec. 22, 1970

3,549,270
SEALING DEVICE
James Alexander Petrie, Thomas Steel, Michael Poucher, Clifford John Franklin, and Denis McCarthy, Derby, England, assignors to Rolls-Royce Limited, Derby, England, a British company
Filed Jan. 10, 1969, Ser. No. 790,257
Claims priority, application Great Britain, Jan. 18, 1968, 2,744/68
Int. Cl. F01d 11/00; F03b 11/00
U.S. Cl. 415—112
6 Claims

ABSTRACT OF THE DISCLOSURE

A sealing device comprises a stator, a rotor having a first part between which and the stator there is interposed a movable sealing member, the sealing member being sealed to the stator and defining a chamber therewith, a passage which is defined between the sealing member and the said first part of the rotor and which contains two restrictions with a space therebetween the size of the said restrictions varying with movement of the sealing member, and the said space communicating with the said chamber, the said passage extending between two areas of different pressures, and means for venting the said chamber, the sealing member having a portion which is spaced from said passage and which effects a seal with a second part of the rotor, the construction being such that the pressures acting on the sealing member urge the latter toward a position in which the said portion of the sealing member is slightly spaced from, but sealed to, the said second part of the rotor.

---

This invention concerns a sealing device.

According to the present invention, there is provided a sealing device comprising a stator, a rotor having a first part between which and the stator there is interposed a movable sealing member, the sealing member being sealed to the stator and defining a chamber therewith, a passage which is defined between the sealing member and the said first part of the rotor and which contains two restrictions with a space therebetween, the size of the said restrictions varying with movement of the sealing member, and the said space communicating with the said chamber, the said passage extending between two areas of different pressures, and means for venting the said chamber, the sealing member having a portion which is spaced from said passage and which effects a seal with a second part of the rotor, the construction being such that the pressures acting on the sealing member urge the latter toward a position in which the said portion of the sealing member is slightly spaced from, but sealed to, the said second part of the rotor.

The said passage may have a restricted portion whose size is unaffected by substantial movement of the sealing member from the said first part of the rotor.

The sealing member is preferably axially movable, the said restrictions and space being provided in a radially extending passage or radially extending portion of said passage.

The area of higher pressure is preferably bounded by a first surface of the sealing member which faces in the axially opposite direction to that of a second surface thereof which bounds the said chamber.

The means for venting the said chamber could effect venting to any low pressure region, and this could, for example, comprise an adjustable valve for venting the said chamber to atmosphere. Preferably, however, the said means for venting the said chamber comprise at least one aperture which extends through the sealing member, and which communicates with the area of lower pressure.

The sealing member may have at least one conduit extending therethrough for conducting pressure fluid from the area of higher pressure to a point of use. Thus the or each conduit may be arranged to direct the pressure fluid into ducting in the rotor to effect cooling of the latter.

The invention also comprises a gas turbine engine provided with a sealing device as set forth above.

Thus the sealing member may be in sealing relationship with a turbine rotor of the engine so as to limit the escape of cooling air supplied thereto.

The invention is illustrated, merely by way of example, in the accompanying drawings, in which:

FIG. 1 is a diagrammatic view, partly broken-away, of a gas turbine engine provided with a sealing device according to the present invention, and FIG. 2 is a broken-away sectional view on a larger scale of part of the structure shown in FIG. 1.

In FIG. 1 there is shown a gas turbine engine 10 having an engine casing 11 within which there is an annular flow duct in which there are arranged in flow series low and high pressure compressors 12, combustion equipment 13, nozzle guide vanes 14, a high pressure turbine 15, and a low pressure turbine 16, the turbine exhaust gases being directed to atmosphere through a short exhaust duct 17.

As shown in FIG. 2, the high pressure turbine 15 has a rotor disc 20 which carries a plurality of angularly spaced apart turbine rotor blades 21. Each of the turbine rotor blades 21 has a root portion 22 which is provided with ribs 23, 24 which are in sealing relationship with a radially outer portion 25 of an axially movable annular sealing member 26.

The sealing member 26 is provided at its radially outer surface with a circumferentially extending groove 30 in which is located a piston ring seal 31 which is slidable within a wall member 32. The wall member 32, which forms part of the mounting of the nozzle guide vanes 14, constitutes a portion of the fixed structure of the engine.

The wall member 32 has a portion 33 which is disposed radially inwardly of the piston ring seal 31, the portion 33 providing for the mounting of a piston ring seal 34, which is in sliding contact with a radially inner surface 35 of the sealing memer 26. Thus the piston ring seals 31, 34 which seal the sealing member 26 to the wall member 32, permit the sealing member 26 to move axially. The sealing member 26 and wall member portion 33 are respectively provided with close fitting interengaging dogs 36, 37, which assist in restraining radial movement of the sealing member 26.

Bolted to the upstream side of the rotor disc 20 is an annular sealing disc 38 having radially spaced apart annular ribs 39, 40. A passage 41, which is substantially L-shaped in section, is defined between the sealing disc 38 and the sealing member 26. The passage 41 has a radially extending portion which has restrictions 42, 43 with an enlarged space 44 therebetween. The passage 41 also has an axially extending portion which comprises a restriction 45 and an enlarged part forming a space 46, the restriction 43 providing a communication between the spaces 44, 46. The restrictions 42, 43 are defined between the annular ribs 39, 40 and radially spaced apart annular ribs 50, 51 on the sealing member 26. The restriction 45 is defined between an annular rib 52 on the sealing member 26 and an end surface 53 on the sealing disc 38. Under normal running conditions, the radial width of the restriction 45 is substantially greater than the axial width of the restrictions 42, 43.

The radially inner end of the passage 41 communicates with an area 54 which is supplied with high pressure air from the high pressure compressor, this high pressure air passing to the area 54 from a duct 55 as indicated by arrow 56.

The radially outer end of the passage 41 communicates with a closed area 60 which is defined between the sealing member 26, the rotor disc 20, and the sealing disc 38, the pressure in the area 60 being below that in the area 54.

The sealing member 26 has a radially extending surface 61 which defines with the wall 32 a chamber 62. The sealing member 26 has a plurality of angularly spaced apart drillings 63 (only one shown) therethrough which provide communication between the space 44 and the chamber 62 so that the pressure in the chamber 62 is substantially the same as, that in the space 44.

The sealing member 26 has a plurality of angularly spaced apart radially extending conduits 64 therethrough, whose radially inner ends communicate with the area 54. Cooling fluid from the area 54 may therefore pass radially outwardly through the conduits 64 and thus through preswirl vanes 65 located at the radially outer ends thereof. This cooling fluid which has passed through the preswirl vanes 65 is directed into a plenum chamber 66 in the rotor disc 20 from which it passes (by way of ducting, not shown) into hollow interiors of the turbine rotor blades 21. As will be appreciated the seal between the ribs 23, 24 and the portion 25 of the sealing member 26 will limit or prevent this high pressure cooling air from escaping between the turbine blades 21 and the nozzle guide vanes 14, and will thus enable a higher pressure of cooling air to be used then would otherwise be possible.

The cooling fluid being transferred from the preswirl vanes 65 to the plenum chamber 66 will, in part, leak into the area 60 so that as indicated above the pressure in the latter will be substantially below that in the area 54. The pressure in the area 60 will also be affected by flow through the passage 41 which extends between the areas 54, 60, the restrictions 42, 43, 45 causing the pressure of the fluid in the passage 41 to suffer a series of pressure drops. The pressure in the area 60 will also be affected by flow through vent apertures 67 which extend through the sealing member 26 and which communicate both with chamber 62 and with the area 60, there being in operation a constant flow from the area 54 and via the space 44, drillings 63, chamber 62, and vent apertures 67 to the area 60.

The pressures on the radially extending surface 61 and on the upstream surface of the space 44 respectively act on the sealing member 26 in opposite axial directions. In view, however, of the large size of the radially extending surface 61 by comparison with that of the said upstream surface of the space 44, there is a substantial net axial force acting in a downstream direction. This force is opposed by a force resulting from the pressure of the cooling fluid in the area 54 acting on a substantially radially extending surface 70 of the sealing member 26, the surface 70 facing the sealing disc 38. If, therefore, the sealing member 26 approaches the sealing disc 38, the pressure in the space 44 will fall by reason of the decreased size of the restrictions 42, 43, and the force acting on the surface 61 will therefore fall likewise. The force acting on the surface 70 will therefore tend to restore the sealing member 26 to an equilibrium position.

Similarly, if the sealing member 26 moves axially upstream and thus away from the sealing disc 38, the size of the restrictions 42, 43 will increase pressure in the space 44 and hence in the chamber 62 will rise, and the sealing member 26 will thus be urged axially downstream into the equilibrium position.

The size of the surfaces 61, 70 is, of course, arranged suitably in relation to the pressures thereon to maintain a desired axial spacing between the sealing member 26 and the sealing disc 38.

When the engine 10 is starting from rest, the sealing member 26 could well be completely retracted, i.e., in its most upstream position. In this position, the restrictions 42, 43 will not produce the required pressure drop between the pressures in the areas 54, 60 to position the sealing member 26 properly. The provision of the restriction 45, however, whose size will not be affected by the position of the sealing member 26, will ensure that the said pressure drop is maintained at this time.

Moreover, if there should be some failure as a result of which substantial axial separation should occur between the sealing member 26 and the sealing disc 38, nevertheless the restriction 45 will continue to maintain a seal therebetween.

The width of the restriction 45 is, under normal running conditions, greater than that of the restrictions 42, 43, with the result that, under such normal running conditions, the seal provided by the restriction 45 does not affect operation of the sealing member 26.

It will be noted that the seal provided between the ribs 23, 24 and the sealing member 26 is maintained by appropriate positioning of the sealing member 26, and that the said positioning is affected by the provision of the passage 41 which is substantially spaced radially inwardly from the ribs 23, 24. Thus the seal provided by the passage 41 acts as a servo seal which effects maintenance of the seal at the ribs 23, 24, the seal at the ribs 23, 24 being provided in a region in which space is limited and in which, therefore, there is no room for complicated sealing devices. It will also be noted that, even if the ribs 50, 51 should become worn, this is of little importance since the sealing member 26 will then move slightly downstream to take up the wear.

The wall member 32 defines with a wall member 71 a passage 72 which receives part of the cooling air from the duct 55. The cooling air from the passage 72 passes, as indicated by arrows 73, 74, 75, into the interiors of the nozzle guide vanes 14 to pass out therefrom through slots 76 adjacent their trailing edges.

As will be appreciated, the seal between the ribs 23, 24 and the sealing member 26 prevents any substantial quantity of cooling air from passing radially outwardly therethrough and between the nozzle guide vanes 14 and turbine rotor blades 21. This is of great importance since the efficiency of a modern high temperature gas turbine engine is considerably affected by the pressure at which cooling air can be supplied to the turbine rotor blades.

We claim:

1. A sealing device comprising a stator, a rotor, an axially movable sealing member interposed between the stator and a first part of the rotor, the sealing member being axially movable at least with respect to said stator and in response to pressures acting thereon, the sealing member being sealed to the stator and defining a chamber therewith, means providing a passage which is defined between the sealing member and the said first part of the rotor, said passage having a radially extending portion which contains first and second restrictions with a space therebetween, and an axially extending portion which contains a third restriction, the size of the said first and second restrictions varying with axial movement of the sealing member, and means providing communication between the said space between said first and second restrictions and the said chamber, the said passage extending between two areas of different pressures, and means for venting the said chamber, the sealing member having a portion which is spaced radially outwardly from the axially extending portion of said passage and which effects a seal with a second part of the rotor, the pressures acting on the sealing member urging the latter axially towards a position in which the said portion of the sealing member is slightly spaced from, but sealed to, the said second part of the rotor.

2. A sealing device as claimed in claim 1 in which one of said two areas is an area of higher pressure bounded by a first surface of the sealing member which faces in the axially opposite direction to that of a second surface thereof which bounds the said chamber.

3. A sealing device as claimed in claim 1 in which one of said two areas is an area of lower pressure, and in which means for venting the said chamber comprise at least one aperture which extends through the sealing member and which communicates with the area of lower pressure.

4. A sealing device as claimed in claim 1 in which one of said two areas is an area of higher pressure, and in which the sealing member has at least one conduit extending therethrough for conducting pressure fluid from the area of higher pressure to a point of use.

5. A sealing device as claimed in claim 6 including ducting in said rotor and in which the conduit is arranged to direct the pressure fluid into the ducting in the rotor to effect cooling of the latter.

6. A turbine of a gas turbine engine having a stator, a rotor, an axially movable sealing member interposed between the stator and a first part of the rotor, the sealing member being axially movable at least with respect to said stator and in response to pressures acting thereon, the sealing member being sealed to the stator and defining a chamber therewith, means providing a passage which is defined between the sealing member and the said first part of the rotor, said passage having a radially extending portion which contains first and second restrictions with a space therebetween, and an axially extending portion which contains a third restriction, the size of the said first and second restrictions varying with axial movement of the sealing member, means providing communication between the said space intermeidate said first and second restrictions and the said chamber, the said passage extending between two areas of different pressures, and means for venting the said chamber, the sealing member having a portion which is spaced radially outwardly from the axially extending portion of said passage and which effects a seal with a second part of the rotor, the pressures acting on the sealing member urging the latter axially towards a position in which the said portion of the sealing member is slightly spaced from, but sealed to, the said second part of the rotor, and means for supplying cooling air to the rotor, the sealing member limiting escape of the said cooling air.

References Cited

UNITED STATES PATENTS

| 3,383,033 | 5/1968 | Moore | 415—113 |
| 3,314,648 | 4/1967 | Howald | 415—115 |

FOREIGN PATENTS

| 250,609 | 3/1964 | Australia | 415—180 |
| 1,086,950 | 8/1960 | Germany | 415—180 |
| 267,494 | 6/1950 | Switzerland | 415—172 |
| 275,574 | 8/1951 | Switzerland | 415—180 |

HENRY F. RADUAZO, Primary Examiner

U.S. Cl. X.R.

415—172, 180